(12) United States Patent
Giraud

(10) Patent No.: US 10,532,831 B2
(45) Date of Patent: Jan. 14, 2020

(54) METHOD AND SYSTEM FOR ACQUIRING IMAGES VIA A CONSTELLATION OF OBSERVATION SATELLITES

(71) Applicant: AIRBUS DEFENCE AND SPACE SAS, Toulouse (FR)

(72) Inventor: Emmanuel Giraud, Escalquens (FR)

(73) Assignee: Airbus Defence and Space SAS, Toulouse (FR)

(*) Notice: Subject to any disclaimer, the term of this patent is extended or adjusted under 35 U.S.C. 154(b) by 38 days.

(21) Appl. No.: 16/063,694

(22) PCT Filed: Dec. 14, 2016

(86) PCT No.: PCT/FR2016/053432
§ 371 (c)(1),
(2) Date: Jun. 18, 2018

(87) PCT Pub. No.: WO2017/103481
PCT Pub. Date: Jun. 22, 2017

(65) Prior Publication Data
US 2019/0337643 A1    Nov. 7, 2019

(30) Foreign Application Priority Data
Dec. 18, 2015    (FR) ..................... 15 62765

(51) Int. Cl.
*B64G 1/10*    (2006.01)
*H04B 7/185*    (2006.01)
(Continued)

(52) U.S. Cl.
CPC ......... *B64G 1/1085* (2013.01); *B64G 1/1021* (2013.01); *H04B 7/18513* (2013.01);
(Continued)

(58) Field of Classification Search
CPC ... B64G 1/1021; B64G 1/1085; H04W 84/06; H04W 48/10; H04W 4/06;
(Continued)

(56) References Cited

U.S. PATENT DOCUMENTS 4,672,656 A * 6/1987 Pfeiffer ................. H04W 68/00
455/12.1
5,592,481 A * 1/1997 Wiedeman ......... H04B 7/18534
370/316
(Continued)

FOREIGN PATENT DOCUMENTS

DE    10 2008 006432 A1    8/2009

OTHER PUBLICATIONS

Gastellu-Etchegorry, "Acquisition et traitement d'image numerique," Internet, Apr. 1, 2008, pp. 77-85, Universite Paul Sabatier, France, http://www.cesbio.ups-tlse.fr/data_all/pdf/T108.pdf.

*Primary Examiner* — Olumide Ajibade Akonai
(74) *Attorney, Agent, or Firm* — Im IP Law; Chai Im; C. Andrew Im

(57) ABSTRACT

A method for acquiring images using a constellation of satellites in non-geosynchronous terrestrial orbit. The satellites include respective devices for inter-satellite communication. An aggregate of work plans intended for various satellites is formed. A ground station transmits the aggregate intended for one satellite. The satellite receiving the aggregate retransmits the aggregate intended for at least one other satellite from the ground station. Each satellite receiving the aggregate from another satellite re-transmits the aggregate intended for at least one other satellite. Each satellite recovers its work plan from the aggregate received.

17 Claims, 2 Drawing Sheets

(51) Int. Cl.
*H04B 7/195* (2006.01)
*H04W 84/06* (2009.01)

(52) U.S. Cl.
CPC ..... *H04B 7/18521* (2013.01); *H04B 7/18523* (2013.01); *H04B 7/195* (2013.01); *H04W 84/06* (2013.01)

(58) Field of Classification Search
CPC .............. H04B 7/18513; H04B 7/1851; H04B 10/118; H04B 7/2041; H04B 7/18515; H04B 7/18582; G01C 21/367
See application file for complete search history.

(56) References Cited

U.S. PATENT DOCUMENTS

| | | | |
|---|---|---|---|
| 6,775,251 B1* | 8/2004 | Wiedeman | H04B 7/18558 370/316 |
| 7,180,873 B1* | 2/2007 | Monte | H04B 7/204 370/325 |
| 7,502,382 B1 | 3/2009 | Liu et al. | |
| 8,195,188 B2* | 6/2012 | Fomukong | H04B 7/18567 455/404.1 |
| 8,977,619 B2* | 3/2015 | Mann | G06Q 10/06314 707/736 |
| 2004/0158832 A1* | 8/2004 | Chechik | G01C 11/025 718/102 |
| 2006/0155840 A1* | 7/2006 | Giffin | H04B 7/18578 709/224 |
| 2010/0309313 A1* | 12/2010 | Antikidis | B64G 1/1021 348/144 |
| 2011/0206096 A1* | 8/2011 | Antikidis | H04B 7/18578 375/211 |
| 2014/0039963 A1 | 2/2014 | Augenstein et al. | |

\* cited by examiner

METHOD AND SYSTEM FOR ACQUIRING IMAGES VIA A CONSTELLATION OF OBSERVATION SATELLITES

RELATED APPLICATIONS

This application is a § 371 application from PCT/FR2016/053432 filed Dec. 14, 2016, which claims priority from French Patent Application No. 15 62765 filed Dec. 18, 2015, each of which is incorporated herein by reference in its entirety.

TECHNICAL FIELD

The present invention lies within the field of Earth observation, and relates, more particularly, to a method and a system for acquiring images via a constellation of satellites in non-geosynchronous orbit.

BACKGROUND OF THE INVENTION

Terrestrial observation missions carried out by an observation satellite consist in acquiring images of terrestrial areas, that is to say areas located on the surface of the Earth, in response to requests sent by clients. Usually, an observation satellite is placed in a non-geosynchronous Earth orbit so that it can acquire different terrestrial areas over a period of time, depending on its position in the orbit concerned.

The development of the agility of observation satellites has also made it possible to increase the number of terrestrial areas that can be imaged, and these areas may now be, notably, located on either side of the projection of the orbit onto the Earth's surface, by suitable control of the attitude of the observation satellite. Thus, for each position of an observation satellite in its orbit, there is a plurality of possibilities for the terrestrial area to be imaged.

Usually, a work plan, comprising a list of acquisitions to be performed by an observation satellite, is calculated on the ground on the basis of various requests received from clients. The work plan calculated in this way is transmitted by a ground station to the observation satellite. A new work plan is calculated and transmitted to an observation satellite in a regular way, usually on a daily basis.

At the present time, requests for such acquisitions of terrestrial areas are increasing in number, and must be met within decreasing time scales, as a result, notably, of the increasing opening of the imaging market to the general public.

The increased number of observation satellites enables satellite access to a terrestrial area to be provided within a much shorter time. However, this capacity cannot be fully utilized unless the work plan of each observation satellite can also be updated promptly.

In the case of observation missions, the inclination of the orbits concerned is such that the observation satellites pass close to the Earth's poles, and the ground stations are preferably positioned near one of the Earth's poles, usually the North Pole. Consequently, an updated work plan can only be transmitted to a given observation satellite when said observation satellite overflies said ground station, which occurs only once per orbital period at the best, the positioning of the ground station near one of the Earth's poles making it possible to increase the number of orbital periods during which said observation satellite actually overflies said ground station in the course of a day. The orbital periods of existing observation satellites are usually longer than an hour, whereas it is desirable to be able to update the work plan of each observation satellites within a much shorter period of about ten minutes.

Furthermore, the time taken to respond to a request depends not only on the time required to communicate an updated work plan to an observation satellite, but also, notably, on the time required to retrieve the images acquired by the observation satellite in response to this request. Like the updating of the work plan, the retrieval of the acquired images usually takes place near the North Pole, when the observation satellite transmits said acquired images to a ground station. Consequently, in the best case, at least one orbital period elapses between the instant at which the observation satellite receives an updated work plan and the instant at which the images acquired in response to this updated work plan are received by a ground station.

SUMMARY OF THE INVENTION

The object of the present invention is to overcome some or all of the limitations of the prior art solutions, notably those described above, by proposing a solution which makes it possible to reduce the time required to respond to a request for the acquisition of an image.

In particular, the present invention proposes, in the case of an image acquisition system comprising a constellation of satellites, to reduce the time required to communicate an updated work plan to any of said observation satellites.

For this purpose, according to a first aspect, the invention relates to a method of acquiring images by means of a constellation of satellites in non-geosynchronous Earth orbit, each satellite comprising an observation instrument controlled according to a work plan comprising a list of acquisitions to be performed. Said satellites comprising respective inter-satellite communication means, and being configured so that each satellite may exchange data with any of the other satellites of the constellation, directly or via one or more other satellites of the constellation, said acquisition method comprises:

the formation of an aggregate of work plans intended for different satellites of the constellation, the transmission, by a ground station, of the aggregate to a satellite of the constellation, and the retransmission, by the satellite that has received the aggregate from the ground station, of said aggregate to at least one other satellite of the constellation.

Additionally, each satellite that receives the aggregate from another satellite retransmits said aggregate to at least one other satellite of the constellation if said aggregate comprises a work plan which has not yet been communicated to the satellite for which it is intended, each satellite retrieving, from the received aggregate, the work plan which is intended for it.

Thus the present invention is based on the formation of an aggregate of work plans intended for a plurality of satellites of the constellation. The aggregate is transmitted by a ground station to any of the satellites of the constellation, and is then propagated progressively from one satellite of the constellation to another, using the inter-satellite communication means of said satellites. Each satellite of the constellation may therefore receive the aggregate, regardless of which satellite has initially received said aggregate from the ground station, and may retrieve from the aggregate the work plan intended for it, provided that such a work plan is present in the aggregate.

Since the aggregate, comprising work plans intended for a plurality of satellites, may be transmitted initially to any of the satellites of the constellation, the opportunities for transferring the work plans to the constellation of satellites are more numerous than in the prior art solutions. This is because the overflight of a ground station by a satellite is more frequent in the case of a constellation of satellites.

Furthermore, the speed at which the aggregate may be propagated within the constellation of satellites is greater than the speed of travel of the satellites in their respective non-geosynchronous orbits. The time required to communicate the aggregate of work plans from a satellite overflying the ground station to another satellite of the constellation is therefore less than the time required for said other satellite to cover the distance enabling it to overfly the ground station.

Consequently, since the aggregate may be transmitted to any of the satellites of the constellation, and since said aggregate is propagated progressively from one satellite of the constellation to another, the time required to communicate a work plan to any of the satellites of the constellation is greatly reduced by comparison with the prior art solutions.

Moreover, a work plan may therefore be communicated rapidly from a ground station located near the North Pole to a satellite overflying the South Pole, said work plan comprising a list of acquisitions to be performed during the return of said satellite from the South to the North Pole. In such a case, the images acquired by this satellite may be retrieved when it overflies the North Pole, at the end of half an orbital period.

In particular embodiments, the image acquisition method may also have one or more of the following characteristics, considered separately or in any technically feasible combinations.

In particular embodiments, each satellite retrieving a work plan removes said work plan from the aggregate before retransmitting said aggregate.

Such arrangements are particularly advantageous, since the amount of data retransmitted by a satellite is less than the amount of data received. Consequently, the time required to communicate the aggregate to all the satellites of the constellation is reduced, since the amount of data represented by the aggregate, and therefore the length of time required to exchange the aggregate between two satellites of the constellation, decreases on each retransmission.

In particular embodiments, each satellite retransmitting the aggregate removes from said aggregate each work plan which has already been communicated to the satellite for which it is intended.

Such arrangements are particularly advantageous, since they provide a further reduction in the amount of data retransmitted by the satellites, and in the time required to communicate the aggregate to all the satellites of the constellation.

In particular embodiments, the aggregate comprises control information enabling a satellite to determine whether the received aggregate is to be retransmitted.

In particular embodiments, the control information is a retransmission counter whose value is updated by the satellites, or is an identifier of the satellite that has received the aggregate from the ground station.

According to a second aspect, the present invention relates to an observation system comprising a constellation of satellites in non-geosynchronous Earth orbit, each satellite comprising an observation instrument and a control device configured to control said observation instrument according to a work plan comprising a list of acquisitions to be performed. Additionally, said satellites comprise respective inter-satellite communication means, and are configured so that each satellite may exchange data with any of the other satellites of the constellation, directly or via one or more other satellites of the constellation, and the control device of each satellite is configured to retrieve a work plan intended for it from an aggregate of work plans received by the inter-satellite communication means of said satellite, and to retransmit said aggregate via said inter-satellite communication means if said aggregate comprises a work plan which has not yet been communicated to a satellite of the constellation.

In particular embodiments, the observation system may also have one or more of the following characteristics, considered separately or in any technically feasible combinations.

In particular embodiments, the satellites of the constellation are distributed among at least two different orbits having the same inclination and the same altitude.

Since the satellites of the constellation are distributed in at least two different orbits, and therefore in at least two different orbital planes, the geographical surface area covered by the constellation of satellites during an orbital period is greater than in the case where all the satellites are located in the same orbital plane. The satellites located in different orbits may also exchange data with one another, so that the satellite receiving the aggregate from the ground station may always propagate said aggregate to any of the other satellites of the constellation, including a satellite in another orbit, within a limited time interval.

In particular embodiments, a plurality of satellites are distributed regularly over each orbit, the satellites in different orbits are offset relative to one another, and the number of satellites in each orbit and the offset between satellites in different orbits are such that, for each satellite, the other satellites in the same orbit are masked by the Earth, and at least two satellites in another orbit are not masked by the Earth.

Such arrangements are advantageous in that they can limit the effect of inter-satellite communication requirements on the total number of satellites of the constellation, the main mission of which is to acquire images. This is because the number of satellites in the same orbit is limited, so that two satellites in the same orbit cannot directly exchange data with one another. However, the communication of the aggregate to any of the satellites of the constellation is provided by the progressive propagation between satellites in different orbits.

In particular embodiments, the orbits of the satellites of the constellation are sun-synchronous orbits.

In particular embodiments, the angular distance between each pair of adjacent orbits is less than 3 hours.

In particular embodiments, the inter-satellite communication means of each satellite are bidirectional toward two different areas, located on either side of said satellite.

In particular embodiments, the inter-satellite communication means of each satellite comprise two antennas aimed toward respective different areas on either side of said satellite.

In particular embodiments, the inter-satellite communication means of each satellite are adapted to transmit and receive data via each of said two antennas.

In particular embodiments, for each satellite, the respective main directions of radiation of the two antennas are fixed relative to a body of said satellite.

In particular embodiments, for each satellite, the respective main directions of radiation of the two antennas, when said satellite is placed in a mission attitude, coincide with a roll axis of said satellite, and the respective main radiation lobes of said two antennas are globally invariant by rotation about their main directions of radiation.

Since the respective main radiation lobes of said antennas are invariant by rotation about the roll axis when the satellite is placed in its mission orbit, the areas covered by said antennas are substantially the same regardless of the roll attitude of the satellite about this roll axis. Consequently, data may be exchanged between satellites regardless of the roll attitude of each satellite, which is generally determined by the position of the satellite relative to the terrestrial area to be imaged. Thus data exchanges between satellites are possible even when the satellites are in the process of acquiring images.

In particular embodiments, the inter-satellite communication means of each satellite transmit and receive data in the same frequency band.

In particular embodiments, the inter-satellite communication means of each satellite are of the half-duplex type.

In particular embodiments, the observation system comprises an acquisition planning center configured to form an aggregate of work plans intended for different satellites of the constellation, and a ground station adapted to transmit said aggregate to a satellite of the constellation.

DESCRIPTION OF THE FIGURES

The invention will be more clearly understood from the following description which is provided by way of non-limiting example, and which refers to the drawings which show the following.

In these figures, references which are identical from one figure to another denote identical or similar elements. For the sake of clarity, the elements represented are not to scale unless specified otherwise.

DETAILED DESCRIPTION OF EMBODIMENTS

Figure 1:
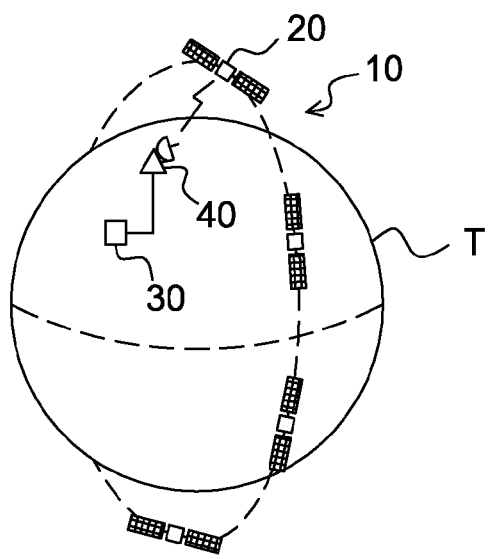
FIG. 1: a schematic representation of an image acquisition system comprising a constellation of satellites in non-geosynchronous Earth orbit.

FIG. 1 shows schematically a system 10 for acquiring images of areas on the surface of the Earth T by means of a constellation of satellites 20 in non-geosynchronous Earth orbit. In the remainder of the description, $N_{CONS}$ denotes the total number of satellites 20 of the constellation.

Each satellite 20 of the constellation comprises an observation instrument 21 and a control device (not shown in the figures) which controls said observation instrument 21 according to a work plan comprising a list of acquisitions to be performed.

The work plans intended for the different satellites 20 of the constellation are, for example, calculated by an acquisition planning center 30, on the basis of requests issued by clients. The work plans are transmitted to the satellites 20 of the constellation via a ground station 40 connected to said acquisition planning center 30.

In the non-limiting example shown in FIG. 1, the acquisition planning center 30 and the ground station 40 are separate equipments. However, in other examples, a single equipment can operate as both an acquisition planning center 30 and a ground station 40. The image acquisition system 10 may also comprise, in particular embodiments, a plurality of acquisition planning centers 30 and/or a plurality of ground stations 40 adapted to transmit work plans to the satellites 20 of the constellation.

Advantageously, the satellites 20 of the constellation further comprise respective inter-satellite communication means, via which said satellites may exchange data with one another.

More particularly, the inter-satellite communication means of the different satellites 20 of the constellation are used to relay one or more work plans from one satellite 20 to another of the constellation, until each work plan reaches the satellite 20 for which it is intended.

Consequently, the parameters of the constellation, in terms of respective orbits and positions in the orbits of the different satellites 20, and in terms of the respective inter-satellite communication means of the different satellites 20, must be designed so that each satellite 20 may exchange data with any of the other satellites 20 of the constellation, directly or via one or more other satellites 20 of the constellation, which relay the received data from one satellite to another satellite of the constellation if necessary. Evidently, therefore, each satellite 20 must be able, notably, to exchange data with at least two other satellites 20 of the constellation, in order to be able to receive data from a first satellite and retransmit said data to a second satellite of the constellation.

More detailed examples of suitable configurations of the satellites 20 (in terms of parameters of the constellation and inter-satellite communication means) are described below.

Figure 2:
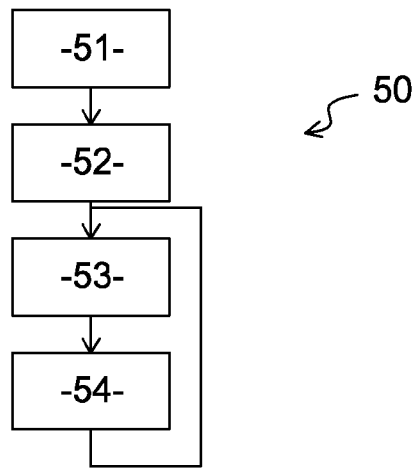
FIG. 2: a diagram illustrating the main steps of an image acquisition method.

FIG. 2 shows schematically the main steps of an image acquisition method 50.

As shown in FIG. 2, the image acquisition method 50 comprises a step 51 of formation, by the acquisition planning center 30, of an aggregate of at least two work plans intended for different satellites 20 of the constellation. It should be noted that the number of work plans included in the aggregate is preferably equal to $N_{CONS}$; that is to say, it comprises a work plan for each satellite 20 of the constellation. However, the number of work plans included in the aggregate may also be less than $N_{CONS}$; that is to say, the aggregate does not necessarily comprise a work plan for each satellite 20 of the constellation. This is because, since the aggregate formation step 51 is executed in a recurrent manner in order to update the work plans of the different satellites 20 to take into account new requests issued by clients, it is possible that only some of said work plans have to be updated, in which case it is advantageous to include in the aggregate only the work plans that have been updated since the previous formation of an aggregate of work plans. It is also possible, notably, to separate the $N_{CONS}$ work plans intended for the different satellites 20 of the constellation into a plurality of aggregates.

The acquisition method 50 then comprises a step 52 of transmission, by the ground station 40, of the aggregate of work plans intended for a satellite 20 of the constellation. The satellite 20 to which the aggregate is transmitted is typically the first satellite 20 of the constellation that overflies the ground station 40 after said ground station 40 has received the aggregate from the acquisition planning center 30. Evidently, therefore, each satellite 20 of the constellation may, in practice, be required to receive an aggregate comprising work plans of other satellites 20 of the constellation.

If the aggregate comprises a work plan intended for the satellite 20 which receives said aggregate from the ground station 40, this satellite 20 retrieves said work plan intended for it, during a step 53 of retrieval of said work plan. To enable the satellite 20 to identify, within the aggregate, a work plan intended for it, said aggregate may comprise, for example, for each work plan, an identifier of the recipient satellite 20, or any other suitable information.

The image acquisition method 50 then comprises a step 54 of retransmission, by the satellite 20 that has received the aggregate from the ground station 40, of said aggregate to at least one other satellite of the constellation.

Each satellite 20 which receives the aggregate executes, in turn, the step 53 of retrieving the work plan, if the aggregate comprises a work plan intended for the satellite 20 concerned. Additionally, each satellite 20 executes, in turn, the step 54 of retransmitting said aggregate to at least one other satellite 20 of the constellation, if said aggregate comprises a work plan which has not yet been communicated to the satellite for which it is intended. In other words, each satellite 20 relays the received aggregate until each work plan included in the aggregate has been communicated to the recipient satellite.

The remainder of the description is based, in a non-limiting way, on the case in which the aggregate formed by the acquisition planning center 30 always comprises $N_{CONS}$ work plans; that is to say, it always comprises a work plan for each satellite 20 of the constellation.

There are a number of possible methods for enabling a satellite 20 to determine whether the received aggregate is to be retransmitted, and the choice of any particular method constitutes only a variant embodiment of the invention.

According to a first example, the ground station 40 may transmit an aggregate updated at predetermined instants known to the satellites 20 of the constellation, called "instants of updating". In such a case, the satellites 20 may be configured to automatically retransmit a received aggregate during a time interval of predetermined duration following an instant of updating. The predetermined duration of the time interval is chosen so as to ensure that the aggregate is relayed for a sufficient length of time to enable each satellite 20 to receive the work plan intended for it.

According to a second example, the satellites 20 may be configured to relay the same aggregate a predetermined maximum number of times, preferably once only. This is because it may be considered unnecessary, when a satellite 20 has already received and retransmitted an aggregate, to retransmit said aggregate if it is received again by the same satellite 20.

In particular embodiments, the aggregate may comprise control information enabling a satellite 20 which receives it to determine whether the aggregate is to be retransmitted.

For example, the control information may comprise a retransmission counter whose value is updated by the satellites 20. This is because, for a given constellation, it is possible to determine in advance a number $N_{HOP}$ of retransmissions for ensuring that each satellite 20 receives the work plan intended for it, regardless of the satellite 20 which initially receives the aggregate from the ground station 40. Consequently, if the aggregate comprises a retransmission counter whose value is updated by the satellites 20, each satellite 20 is capable of determining whether a received aggregate is to be retransmitted. For example, the retransmission counter may be reinitialized to the value $N_{HOP}$ and decremented by each satellite 20 before retransmission. Consequently, if the retransmission counter included in the aggregate received by a satellite 20 is equal to 0, then said satellite 20 does not retransmit said aggregate.

Alternatively or additionally, the control information may comprise an identifier of the satellite 20 that has received the aggregate from the ground station 40. In fact, for a given constellation, the satellites 20 that are to relay the received aggregate may be wholly determined by the satellite 20 that initially receives the aggregate from the ground station 40. In such a case, each satellite 20 receiving the aggregate may determine, on the basis of the identifier of the satellite 20 that first received said aggregate, whether or not it must retransmit said aggregate to ensure that each work plan is communicated to the satellite 20 for which it is intended.

In preferred embodiments of the image acquisition method 50, each satellite 20 which retransmits the aggregate removes one or more work plans from said aggregate before retransmission, so that the amount of data retransmitted by each satellite 20 decreases as the aggregate is propagated within the constellation of satellites 20. Such arrangements are particularly advantageous, in that they make it possible to reduce the time required to communicate the aggregate to all the satellites of the constellation.

For example, each satellite 20 retrieving a work plan removes said work plan from the aggregate before retransmitting it.

However, the amount of data retransmitted may be further reduced if necessary, particularly if each satellite 20 is adapted to retransmit the aggregate to a plurality of other satellites 20. In such a case, a plurality of satellites 20 are reached on each retransmission. The number of satellites 20 reached with the same number of retransmissions may therefore be greater than this number of retransmissions. Evidently, therefore, a satellite 20 may remove from the aggregate, before retransmitting the latter, all the work plans that may be communicated to their recipient satellites 20 with the same number of retransmissions as said satellite 20 concerned.

Figure 3:
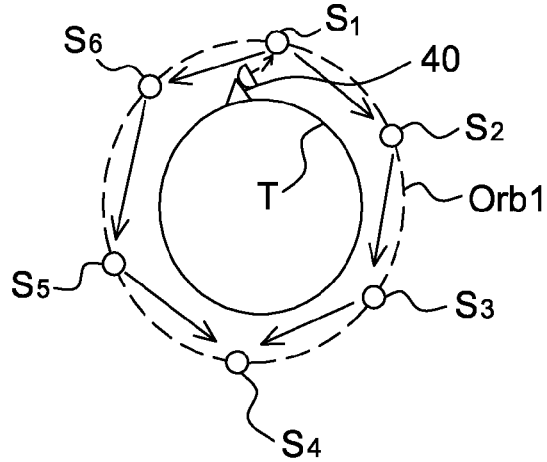
FIG. 3: a diagram illustrating the operating principle of a preferred embodiment of the image acquisition method of FIG. 2, FIG. 4: a schematic representation of a preferred embodiment of a satellite of the image acquisition system.

Consequently, in preferred embodiments, each satellite 20 retransmitting the aggregate removes from said aggregate each work plan which has already been communicated to the satellite for which it is intended. FIG. 3 shows a diagram illustrating the operating principle of such embodiments of the image acquisition method 50.

The example illustrated in FIG. 3 is based, in a non-limiting way, on the case in which the satellites 20 of the constellation are placed in respective different positions of the same orbit Orb1. In FIG. 3, the number $N_{CONS}$ of satellites concerned is equal to 6, and said satellites 20 are denoted $S_1$ to $S_6$, respectively. As illustrated in FIG. 3, satellite $S_1$ in this example is the satellite which initially receives the aggregate from the ground station 40. Satellite $S_1$ removes the work plan intended for it from the received aggregate, so that the retransmitted aggregate now comprises five work plans, intended for satellites $S_2$ to $S_6$. In the example illustrated in FIG. 3, satellite $S_1$ retransmits the aggregate to its two neighboring satellites in the orbit Orb1, namely satellites $S_2$ and $S_6$. Thus satellites $S_2$ and $S_6$ are reached with the same number of retransmissions, that is to say one retransmission. Satellite $S_2$ may therefore remove from the aggregate the work plan intended for it, together with the work plan intended for satellite $S_6$. Similarly, satellite $S_6$ may remove from the aggregate the work plan intended for it, together with the work plan intended for satellite $S_2$. Therefore, the aggregate retransmitted by satellite $S_2$ and the aggregate retransmitted by satellite $S_6$ each comprise three work plans, namely the work plans intended for satellites $S_3$ to $S_5$. Satellite $S_2$ retransmits the aggregate to satellite $S_3$, and not to satellite $S_1$, via which said satellite $S_2$ has received said aggregate. Similarly, satellite $S_6$ retransmits the aggregate solely to satellite $S_5$, which has not yet received said aggregate. Thus satellites $S_3$ and $S_5$ are reached with the same number of retransmissions, that is to say two retransmissions. Satellite $S_3$ may therefore remove from the aggregate the work plan intended for it, together with the work plan intended for satellite $S_5$. Similarly, satellite $S_5$ may remove from the aggregate the work plan intended for it, together with the work plan intended for satellite $S_3$. Therefore, the aggregate retransmitted by satellite $S_3$ and the aggregate retransmitted by satellite $S_5$ each comprise a single work plan, namely the work plan intended for satellite $S_4$. It is also possible, in such a case, for only one of said satellites $S_3$ and $S_5$ to retransmit the aggregate to satellite $S_4$.

In such a case, therefore, each satellite 20 must be capable of determining which work plans are to be removed from the aggregate before retransmission. There are a number of possible methods for enabling a satellite 20 to identify the work plans to be removed from the aggregate before retransmission, and the choice of any particular method constitutes only a variant embodiment of the invention.

For example, the acquisition planning center 30 may organize the aggregate into groups of work plans to be removed successively before each retransmission, said groups of work plans being identifiable by each satellite 20, for example by means of suitable control information included in the aggregate. The groups of work plans depend on the satellite to which the ground station 40 transmits the aggregate. In the example illustrated in FIG. 3, the different groups of work plans are, for example, established and ordered in the following manner:

Group 1: work plan of satellite $S_1$, removed before retransmission (by satellite $S_1$),
Group 2: work plans of satellites $S_2$ and $S_6$, removed before retransmission by satellites $S_2$ and $S_6$,
Group 3: work plans of satellites $S_3$ and $S_5$, removed before retransmission by satellites $S_3$ and $S_5$, and
Group 4: work plan of satellite $S_4$.

Additionally, in such a case, the retransmissions of the aggregate cease as soon as the aggregate is empty, that is to say as soon as all the work plans contained in it have been removed.

It should be noted that, in the example illustrated in FIG. 3, the inter-satellite communication means of each satellite 20 are bidirectional (that is to say, adapted to transmit and receive data) toward two different areas, located on either side of the satellite 20.

This is because such arrangements make it possible to propagate said aggregate from satellite $S_1$, which receives the aggregate from the ground station 40, in two opposite directions within the constellation of satellites, namely in the forward direction of satellite $S_1$ (that is to say, on the side toward which said satellite $S_1$ is moving) and in the backward direction of said satellite $S_1$. Furthermore, this remains true regardless of which satellite initially receives the aggregate from the ground station 40.

However, in other examples, unidirectional inter-satellite communication means can be used, for example those which transmit in the forward direction only and receive in the backward direction only. The cost and complexity of the inter-satellite communication means is then reduced, but the time taken to cover the whole of the constellation is much greater than in the case of inter-satellite communication means which are bidirectional in the forward and backward directions.

Figure 4:
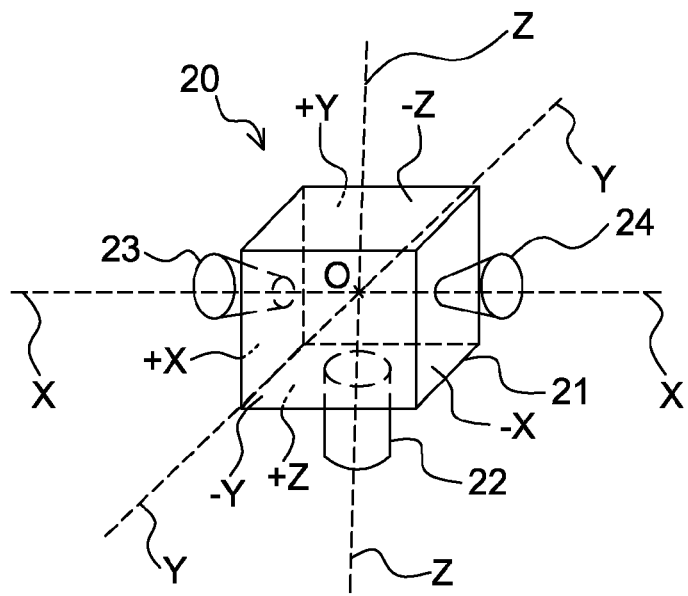

FIG. 4 shows schematically a preferred embodiment of a satellite 20 of the image acquisition system 10.

As mentioned above, the satellite 20 comprises an observation instrument 21 and a device for controlling said observation instrument. Additionally, the control device is adapted to retrieve a work plan intended for it from an aggregate of work plans received by the inter-satellite communication means of said satellite 20, and to retransmit said aggregate via said inter-satellite communication means if required.

The control device comprises, for example, one or more processors and storage means (magnetic hard disk, electronic memory, optical disk, or the like) for storing a computer program product in the form of a set of instructions in program code to be executed in order to perform the various steps relating to the observation mission of the satellite 20. Alternatively or additionally, the control device may comprise one or more programmable logic circuits (FPGA, PLD, etc.) and/or one or more specialized integrated circuits (ASIC), and/or a set of discrete electronic components, or the like, adapted to perform some or all of said steps relating to the observation mission of said satellite 20.

In other words, the control device is configured in terms of software (a program product for a specific computer) and/or hardware (FPGA, PLD, ASIC, discrete electronic components, or the like) to perform the various steps relating to the observation mission of the satellite 20.

For the purposes of description, the satellite 20 is associated with a global reference frame, centered on a center of mass O of the satellite 20 and having three axes X, Y, Z. More particularly, the X axis (also called the roll axis) is parallel to a velocity vector of the satellite 20, the Y axis (also called the pitch axis) is orthogonal to the plane of the orbit of the satellite 20, and the Z axis (also called the yaw axis) is orthogonal to the X and Y axes.

In the remainder of the description, it is assumed, in a non-limiting way, that the satellite 20 comprises a body 21 substantially in the form of a rectangular parallelepiped, which thus has six faces arranged in parallel pairs. It is also assumed, in a non-limiting way, that the attitude of the satellite 20 is controlled, for the purposes of the mission of said satellite 20, around an attitude called the "mission attitude", in which:

two opposed faces of the body 21 of the satellite 20 are substantially orthogonal to the Z axis, and are denoted, respectively, the "+Z face" (facing the Earth T with respect to the center of mass O) and the "−Z face" (on the side opposed to the +Z face);

two opposed faces of the body 21 of the satellite 20 are substantially orthogonal to the X axis, and are denoted, respectively, the "+X face" (in the forward direction of the satellite 20, that is to say on the side toward which said satellite 20 moves, with respect to the center of mass O) and the "−X face" (in the backward direction the satellite 20, that is to say the side opposed to the +X face); and the last two opposed faces of the body 21 of the satellite 20, denoted, respectively, the "+Y face" and the "−Y face", are substantially orthogonal to the Y axis.

In the non-limiting example shown in FIG. 4, the observation instrument 21 is carried by the +Z face of the body 21 of the satellite 20, and its observation axis is substantially orthogonal to said +Z face.

In the preferred embodiment shown in FIG. 4, the inter-satellite communication means of the satellite 20 comprise two antennas:

a first antenna 23 which is carried by the +X face of the body 21 of the satellite 20, a second antenna 24 which is carried by the −X face of said body 21 of said satellite 20.

It should be noted that there are other possible positions for the antennas 23, 24 of the inter-satellite communication means of the satellite 20. On the other hand, said antennas 23, 24 are arranged so that they are directed toward different respective areas on either side of said satellite 20, preferably in the forward direction and in the backward direction of said satellite 20 respectively.

The main directions of radiation of said two antennas 23, 24, that is to say the directions in which the respective maximum gains of said two antennas 23, 24 are obtained, are preferably fixed relative to the body 21 of the satellite 20. In such a case, the antennas 23, 24 on the body 21 of the satellite 20 may be simple and robust. However, in other examples, more complex antennas 23, 24 can be used, such as network antennas adapted to form radiation patterns that are variable over time, or antennas 23, 24 movable relative to said body 21 of the satellite 20, with the aim, notably, of dynamically optimizing the gain in the direction of the other satellites 20 of the constellation.

In the remainder of the description, it is assumed, in a non-limiting way, that the inter-satellite communication means are bidirectional toward in the forward direction and in the backward direction of the satellite 20. If necessary, each of said two antennas 23, 24 is preferably used for both transmission and reception, in order to reduce the number of on-board antennas on the satellite 20. However, in other examples, it is possible to use a separate reception antenna and a separate transmission antenna directed in the forward direction of the satellite 20, and/or a separate reception antenna and a separate transmission antenna directed in the backward direction of the satellite 20.

In preferred embodiments, the respective main directions of radiation of the two antennas 23, 24, when the satellite 20 is placed in its mission attitude, coincide with the roll axis of the orbital reference frame. Additionally, the respective main radiation lobes of said two antennas 23, 24 are advantageously invariant by rotation about their main directions of radiation. In other words, if the main radiation lobe of an antenna 23, 24 is considered to be delimited by the directions of radiation for which the gain is equal to the maximum gain $G_{MAX}$ attenuated by 3 decibels (dB), then said directions of radiation for which the gain is equal to ($G_{MAX}$−3 dB) form a cone of revolution about the main direction of radiation.

In practice, the attitude of the satellite 20 varies around the mission attitude. In particular, the roll attitude of an observation satellite is controlled for the purpose of imaging terrestrial areas located on either side of the projection of the orbit of said satellite on the surface of the Earth T. Since the respective main radiation lobes of said two antennas 23, 24 are advantageously invariant by rotation about their main directions of radiation, and since the latter coincide, in the mission attitude, with the roll axis of the satellite 20, the variations of the roll attitude of the satellite 20 will evidently not prevent the exchange of data between satellites. Therefore, the aggregate may be propagated within the constellation without affecting the image acquisition.

To simplify the design of the inter-satellite communication means, it is possible, notably, to use the same frequency band, for example the S band, for transmitting and receiving data. The aggregate is preferably retransmitted on the same central frequency as that on which it was received. Alternatively or additionally, it is possible to provide inter-satellite communication means of the type referred to in the English literature as "half-duplex", that is to say means adapted both to transmit and to receive data, but not simultaneously.

As illustrated in FIG. 3, the invention is applicable in the case in which the satellites 20 of the constellation are placed in respective different positions of the same orbit.

However, in preferred embodiments, the satellites 20 of the constellation are distributed among at least two different orbits, and therefore in at least two different orbital planes. This is because, in such a case, the geographical surface area covered by the constellation of satellites during an orbital period is greater than in the case where all the satellites are located in the same orbital plane. Furthermore, in the case of sun-synchronous orbits distributed among a number of different orbital planes, it is possible to acquire images of the same terrestrial area at different local times for said terrestrial area. The aggregate of operating plans may also be propagated progressively from a satellite in one orbit to another satellite in another orbit, so that the aggregate may be communicated to any of the satellites 20 of the constellation, regardless of which satellite 20 received said aggregate from the ground station 40.

Preferably, the orbits in which the satellites 20 of the constellation are placed all have the same inclination and the same altitude, in order, notably, to facilitate the design of the inter-satellite communication means of said satellites 20. It is also known that an orbit drifts substantially over time. Preferably, the orbits considered are such that the angular distance between each pair of adjacent orbits remains substantially constant over time, so as to limit the variations of the distances between satellites 20 having different orbits; this may also facilitate the design of the inter-satellite communication means. Theoretically, this condition is satisfied when all the orbits concerned have the same altitude and the same inclination.

In the remainder of the description, it is assumed, in a non-limiting way, that the orbits in which the satellites 20 of the constellation are positioned are sun-synchronous orbits. However, in other examples, other types of non-geosynchronous Earth orbits can be considered.

As mentioned above, by using satellites 20 in different orbits it is possible, notably, to increase the geographical surface covered during an orbital period. Furthermore, the number of satellites 20 in each orbit may be greatly reduced, for a constant geographical surface coverage during an orbital period. In particular, the number of satellites 20 and their respective positions in the same orbit do not necessarily have to allow direct data exchanges between satellites 20 in the same orbit, if said data exchanges between satellites 20 in the same orbit may be carried out indirectly via satellites 20 in one or more other orbits.

For this purpose, in preferred embodiments, the satellites 20 in the same orbit are distributed in a regular way, the satellites 20 in different orbits are offset relative to one another, and the number of satellites in each orbit and the offset between satellites in different orbits are such that, for each satellite 20 of the constellation, the other satellites 20 in the same orbit are masked by the Earth T, and at least two satellites 20 in another orbit are not masked by the Earth T.

For example, if the same number $N_{SAT}$ of satellites 20 is placed in each orbit, then the angular spacing between adjacent satellites 20 in the same orbit is equal to $360/N_{SAT}$ degrees. Additionally, the positions of the satellites 20 in the same orbit are offset relative to the positions of the satellites 20 in an adjacent orbit by an angular spacing by close to $360/(2 \cdot N_{SAT})$ degrees, for example within an approximation of ±5 degrees. The inter-satellite communication means must also be configured so as to allow data exchanges between satellites 20 in different orbits.

Figure 5:
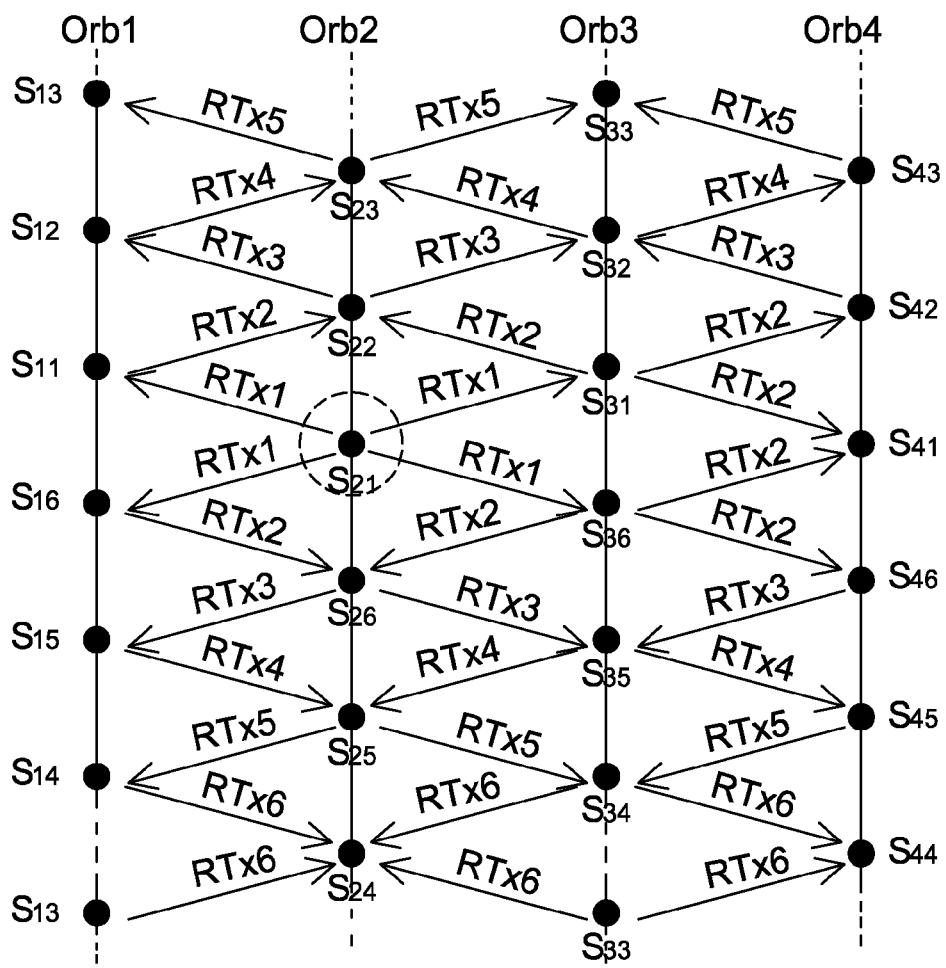
FIG. 5: a diagram illustrating an example of an embodiment of the image acquisition method in the case of a constellation of satellites distributed among four different orbits.

FIG. 5 shows a diagram illustrating the operating principle of the image acquisition method 50 in the case where the satellites 20 are distributed among four different orbits Orb1, Orb2, Orb3 and Orb4. The angular distance between adjacent orbits, that is to say between ascending nodes of said orbits, denoted ΔLTAN in the remainder of the description, is preferably the same for all the adjacent orbits, and is preferably less than 3 hours (or, in an equivalent way, less than 45°). For example, the angular distance ΔLTAN between adjacent orbits is equal to 1 hour and 30 minutes (or equal to 22.5°), if, for example, the local solar times of the ascending nodes of said orbits Orb1, Orb2, Orb3 and Orb4 are equal to 9.45, 11.15, 12.45 and 14.15 hours respectively.

In the example illustrated in FIG. 5, the total number of satellites 20 is equal to 24 ($N_{CONS}$=24), and the number of satellites 20 in each orbit is equal to 6 ($N_{SAT}$=6). The angular spacing between adjacent satellites in the same orbit is therefore 60°, and the offset of the positions of the satellites 20 in the same orbit relative to the positions of the satellites 20 in an adjacent orbit is, for example, 30°. Additionally, in FIG. 5:

the satellites in the orbit Orb1 are denoted $S_{11}$ to $S_{16}$,
the satellites in the orbit Orb2 are denoted $S_{21}$ to $S_{26}$,
the satellites in the orbit Orb3 are denoted $S_{31}$ to $S_{36}$,
the satellites in the orbit Orb4 are denoted $S_{41}$ to $S_{46}$.

Additionally, in the example illustrated in FIG. 5, it is assumed that it is satellite $S_{21}$ that receives an aggregate of $N_{CONS}$ work plans from the ground station 40, and it is assumed that each satellite removes from the aggregate each work plan that has already been communicated to the satellite for which it is intended, before said aggregate is retransmitted.

As illustrated in FIG. 5, satellite $S_{21}$ retransmits the aggregate (first retransmission, denoted RTx1 in FIG. 5) forwards and backwards, to satellites $S_{11}$, $S_{31}$, $S_{16}$ and $S_{36}$, after it has removed the work plan that was intended for it. The retransmitted aggregate therefore comprises 23 work plans.

Satellites $S_{11}$, $S_{31}$, $S_{16}$ and $S_{36}$, then retransmit the aggregate (the second retransmission, denoted RTx2 in FIG. 5) after they have removed the work plans that were intended for them. Each retransmitted aggregate therefore comprises 19 work plans. Satellites $S_{11}$, $S_{31}$ and $S_{36}$ retransmit the aggregate forwards, to satellites $S_{22}$, $S_{42}$ and $S_{41}$. Satellites $S_{16}$, $S_{36}$ and $S_{31}$ retransmit the aggregate backwards, to satellites $S_{26}$, $S_{46}$ and $S_{41}$.

Satellites $S_{22}$, $S_{42}$, $S_{26}$ and $S_{46}$ then retransmit the aggregate (third retransmission, denoted RTx3 in FIG. 5) after they have removed the work plans intended for them, together with the work plan intended for satellite $S_{41}$. Each retransmitted aggregate therefore comprises 14 work plans. Satellites $S_{22}$ and $S_{42}$ retransmit the aggregate forwards, to satellites $S_{12}$ and $S_{32}$. Satellites $S_{26}$ and $S_{46}$ retransmit the aggregate backwards, to satellites $S_{15}$ and $S_{35}$.

Satellites $S_{12}$, $S_{32}$, $S_{15}$ and $S_{35}$ then retransmit the aggregate (the fourth retransmission, denoted RTx4 in FIG. 5) after they have removed the work plans that were intended for them. Each retransmitted aggregate therefore comprises 10 work plans. Satellites $S_{12}$ and $S_{32}$ retransmit the aggregate forwards, to satellites $S_{23}$ and $S_{43}$. Satellites $S_{15}$ and $S_{35}$ retransmit the aggregate backwards, to satellites $S_{25}$ and $S_{45}$.

Satellites $S_{23}$, $S_{43}$, $S_{25}$ and $S_{45}$ then retransmit the aggregate (the fifth retransmission, denoted RTx5 in FIG. 5) after they have removed the work plans that were intended for them. Each retransmitted aggregate therefore comprises 6 work plans. Satellites $S_{23}$ and $S_{43}$ retransmit the aggregate forwards, to satellites $S_{13}$ and $S_{33}$. Satellites $S_{25}$ and $S_{45}$ retransmit the aggregate backwards, to satellites $S_{14}$ and $S_{34}$.

Satellites $S_{13}$, $S_{33}$, $S_{14}$ and $S_{34}$ then retransmit the aggregate (the sixth retransmission, denoted RTx6 in FIG. 5) after they have removed the work plans that were intended for them. Each retransmitted aggregate therefore comprises 2 work plans. Satellites $S_{13}$ and $S_{33}$ retransmit the aggregate forwards, to satellites $S_{24}$ and $S_{44}$. Satellites $S_{14}$ and $S_{34}$ retransmit the aggregate backwards, to satellites $S_{24}$ and $S_{44}$.

It should be noted that it may not be necessary to perform the retransmissions via all the satellites shown in FIG. 5. For example, during the sixth retransmission, it is possible to retransmit only via one or some of satellites $S_{13}$, $S_{33}$, $S_{14}$ and $S_{34}$, provided that satellites $S_{24}$ and $S_{44}$ receive the work plans intended for them. Notably, it is possible to retransmit, during the sixth retransmission, via satellite $S_{33}$ and/or satellite $S_{34}$ only. More generally, it has been found that all the satellites of the constellation may be reached by retransmitting via the satellites in orbits Orb2 and Orb3 only. Therefore, in other examples, it is possible to retransmit the aggregate only via the satellites in orbits Orb2 and Orb3.

The time interval $D_{CONS}$ required, starting from the instant of reception of the aggregate by satellite $S_{21}$, to perform all the retransmissions shown in FIG. 5 and thus communicate the 24 work plans to the different satellites 20 of the constellation is of the order of:

$$D_{CONS} \approx \left(\frac{23}{24} + \frac{19}{24} + \frac{14}{24} + \frac{10}{24} + \frac{6}{24} + \frac{2}{24}\right) \cdot \frac{V}{R} = \frac{74}{24} \cdot \frac{V}{R}$$

in which expression V denotes the amount of data initially included in the aggregate received from the ground station 40 (corresponding to 24 work plans) and R denotes the data rate of the inter-satellite communications.

For example, if it is assumed that the amount of data V initially included in the aggregate is 500 kilobits (kbit), and that the data rate R of the inter-satellite communications is 10 kilobits per second (kbps), then the time interval $D_{CONS}$ is of the order of 2 minutes 34 seconds. Evidently, therefore, the work plan of each satellite 20 of the constellation may be updated in a much shorter period compared with the prior art solutions. Even assuming a data rate R of 2 kbps for the inter-satellite communications, the time interval $D_{CONS}$, which is then of the order of 12 minutes 50 seconds, allows the work plan of each satellite 20 of the constellation to be updated in a much shorter period compared with the prior art solutions.

As mentioned above, the parameters of the constellation, in terms of respective orbits and positions in the orbits of the different satellites 20, and in terms of the respective inter-satellite communication means of the different satellites 20, must be designed so that each satellite 20 may exchange data with any of the other satellites 20 of the constellation, directly or via one or more other satellites 20 of the constellation. The table below shows some entirely non-limiting examples of suitable configurations of satellites 20.

In the table below, it is assumed, by way of example, that the satellites 20 are all of the type shown in FIG. 4, comprising an antenna 23 on the +X face and an antenna 24 on the –X face of the body 21 of the satellite 20 whose main radiation lobes, invariant by rotation about their respective main directions of radiation, are substantially of the same width, denoted ΔΘ. It should be noted that the width ΔΘ corresponds to the complete angle of the cone of revolution formed by the main radiation lobe around the main direction of radiation, so that a width ΔΘ of 60° corresponds to an angular range of ±30° around the main direction of radiation. It is also assumed, by way of example, that the satellites 20 are placed in at least two sun-synchronous orbits at the same altitude of 500 kilometers. Finally, it is also assumed, by way of example, that:

the satellites 20 in the same orbit are distributed regularly (every 360/$N_{SAT}$ degrees), the number $N_{SAT}$ being such that, for each satellite 20 of the constellation, the other satellites 20 in the same orbit are masked by the Earth T, and the satellites 20 in different orbits are offset relative to one another by an angular spacing δψ by such that, for each satellite 20 of the constellation, at least two satellites 20 in another orbit are not masked by the Earth T.

| $N_{SAT}$ | ΔLTAN | δψ | $d_{MIN}/d_{MAX}$ (kilometers) | ΔΘ |
|---|---|---|---|---|
| 6 | 1 hr 00 | 32° | 3530/3950 | 56° |
| 6 | 1 hr 30 | 33° | 3500/4400 | 80° |
| 6 | 2 hrs 00 | 34° | 3450/4930 | 100° |
| 8 | 1 hr 30 | 25.5° | 2630/3750 | 96° |
| 8 | 2 hrs 00 | 26.5° | 2600/4380 | 116° |

The table above therefore shows six examples of suitable configurations of the satellites 20, in terms of parameters of the constellation, particularly the angular distance ΔLTAN between adjacent orbits and the angular spacing δψ between the satellites 20 in adjacent orbits, and in terms of characteristics of the inter-satellite communication means, in particular the width ΔΘ of the main radiation lobes of the antennas 23, 24.

More particularly, with regard to the angular spacing δψ between the satellites 20 in adjacent orbits, it should be noted that this is equal to the shift between the orbital position of a first satellite 20 and the position of a second satellite 20, which is the satellite 20 nearest to said first satellite 20 in the adjacent orbit concerned, on the forward side of said first satellite 20. The table above also shows the minimum distance $d_{MIN}$ and the maximum distance $d_{MAX}$ between adjacent satellites in adjacent orbits. This is because the distance between two adjacent satellites 20 in adjacent orbits varies during the orbital period, and is at a maximum ($d_{MAX}$) when said satellites are near the equator, and is at a minimum ($d_{MIN}$) when said satellites are near the North or South Pole, because the orbits cross over near the North and South Pole.

The angular spacings δψ shown in the above table are slightly different from 360/(2·$N_{SAT}$) degrees. Said angular spacings by shown in the above table make it possible to balance the distances between:

on the one hand, a first satellite and a second satellite which is the nearest satellite to the first satellite on an orbit adjacent to that of said first satellite and on the forward side of said first satellite, on the other hand, the first satellite and a third satellite which is the nearest satellite to said first satellite on an orbit adjacent to that of said first satellite and on the backward side of said first satellite.

The invention claimed is:

1. A method for acquiring images using a constellation of satellites in non-geosynchronous Earth orbit, each satellite comprising an inter-satellite communicator and an observation instrument controlled according to a work plan, the work plan comprising a list of acquisitions to be performed, each satellite being configured to exchange data with any of other satellites of the constellation, directly or via one or more other satellites of the constellation, the method comprising steps of:

forming an aggregate of work plans intended for different satellites of the constellation;

transmitting, by a ground station, the aggregate of work plans to a satellite of the constellation;

transmitting the aggregate of work plans, by a satellite that received the aggregate of work plans from the ground station, to at least one other satellite of the constellation;

retransmitting the aggregate of work plans by each satellite that received the aggregate of work plan from another satellite to said at least one other satellite of the constellation in response to a determination that the aggregate of work plans comprises a work plan which has not yet been communicated to an intended satellite, said each satellite retrieving an intended work plan for said each satellite from the received aggregate of work plans; and performing image acquisitions by said each satellite according to the intended work plan for said each satellite extracted from the received aggregate of work plans.

2. The method as claimed in claim 1, wherein said each satellite retrieving the intended work plan for said each satellite removes the intended work plan from the aggregate of work plans before retransmitting the aggregate of work plans.

3. The method as claimed in claim 1, wherein said each satellite retransmitting the aggregate of work plans removes each work plan which has already been communicated to the intended satellite from the aggregate of work plans.

4. The method as claimed in claim 1, wherein the aggregate of work plans comprises control information enabling a satellite to determine whether the received aggregate of work plans is to be retransmitted.

5. The method as claimed in claim 4, wherein the control information is a retransmission counter whose value is updated by the satellites of the constellation or is an identifier of a satellite that received the aggregate of the work plans from the ground station.

6. An observation system comprising a constellation of satellites in non-geosynchronous Earth orbit, each satellite comprising an inter-satellite communicator and an observation instrument and a controller configured to control the observation instrument according to a work plan, the work plan comprising a list of acquisitions to be performed, each satellite being configured to exchange data with any of other satellites of the constellation, directly or via one or more other satellites of the constellation;

wherein the controller of each satellite is configured to retrieve a work plan intended for said each satellite from an aggregate of work plans received by the inter-satellite communicator of said each satellite, and to retransmit the aggregate of work plans via said inter-satellite communicator in response to a determination that the aggregate of work plan comprises a work plan which has not yet been communicated to an intended satellite of the constellation, and wherein the controller of said each satellite is configured to control the observation instrument to perform image acquisitions according to the work plan intended for said each satellite extracted from the received aggregate of work plans.

7. The system as claimed in claim 6, wherein the satellites of the constellation are distributed among at least two different orbits having a same inclination and a same altitude.

8. The system as claimed in claim 6, wherein the satellites of the constellation are distributed regularly over each orbit; wherein satellites in different orbits are offset relative to one another; and wherein a number of satellites in said each orbit and an offset between the satellites in the different orbits are such that, for each satellite: other satellites in a same orbit are masked by the Earth, and at least two satellites in another orbit are not masked by the Earth.

9. The system as claimed in claim 6, wherein orbits of the satellites of the constellation are sun-synchronous orbits.

10. The system as claimed in claim 6, wherein the inter-satellite communicator of said each satellite is bidirectional toward two different areas on either side of said each satellite.

11. The system as claimed in claim 6, wherein the inter-satellite communicator of said each satellite comprise two antennas directed toward two different areas on either side of said each satellite.

12. The system as claimed in claim 11, wherein the inter-satellite communicator of said each satellite is configured to transmit and receive data via each of the two antennas.

13. The system as claimed in claim 11, wherein, for said each satellite, respective main directions of radiation of the two antennas are fixed relative to a body of said each satellite.

14. The system as claimed in claim 11, wherein, for said each satellite in a mission attitude, respective main directions of radiation of the two antennas coincide with a roll axis of said each satellite, and respective main radiation lobes of the two antennas are globally invariant by rotation about the respective main directions of radiation of the two antennas.

15. The system as claimed in claim 6, wherein the inter-satellite communicator of said each satellite is configured to transmit and receive data in a same frequency band.

16. The system as claimed in claim 6, wherein the inter-satellite communicator of said each satellite is a half-duplex type.

17. The system as claimed in claim 6, further comprising an acquisition planning center configured to form the aggregate of work plans intended for different satellites of the constellation, and a ground station configured to transmit the aggregate of work plans to a satellite of the constellation.

* * * * *